Dec. 4, 1934.      R. I. BATES      1,983,064
PRESSURE RELEASE VALVE
Filed July 13, 1932

Inventor
Ralph I. Bates
By Spencer, Hardman & Who
Attorneys

Patented Dec. 4, 1934

1,983,064

UNITED STATES PATENT OFFICE 1,983,064

PRESSURE RELEASE VALVE

Ralph I. Bates, Dayton, Ohio, assignor, by mesne assignments, to General Motors Corporation, Detroit, Mich., a corporation of Delaware Application July 13, 1932, Serial No. 622,187

7 Claims. (Cl. 277—45)

This invention relates to improvements in fluid flow control devices and particularly such devices adapted for use in hydraulic shock absorbers.

It is among the objects of the present invention to provide a fluid flow control device adapted to establish regulated flows of fluid in two directions through a port, certain members of said device being punched from flat sheet metal whereby material and manufacturing costs are substantially reduced.

Further objects and advantages of the present invention will be apparent from the following description, reference being had to the accompanying drawing wherein a preferred embodiment of one form of the present invention is clearly shown.

Figure 2:
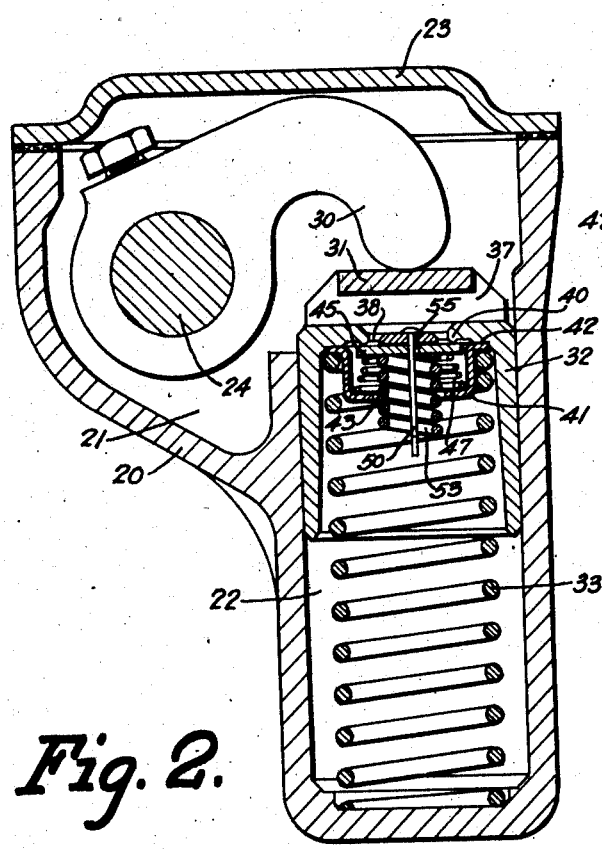
Fig. 2 is a vertical sectional view of the shock absorber having the improved fluid flow control device therein.

Referring to the drawing, the shock absorber is shown comprising a casing 20 providing a fluid reservoir 21 and a cylinder 22. The reservoir is closed by the cover cap 23. A shaft 24 is journalled transversely of the housing or casing 20, one end of said shaft extending outside the casing 20 and having the shock absorber operating arm 25 attached thereto. The free end of this arm is swivelly secured to one end of a link 26, the opposite end of said link being swivelly connected with a member 27 which is clamped to the axle 28 of the vehicle by the clamping member 29. Inside the casing 20 the shaft 24 has a rocker arm 30 attached thereto, which rocker arm engages the head 31 of the piston 32 which is reciprocably carried within the cylinder 22. A spring 33, interposed between the piston 32 and the bottom end of the cylinder 22, urges the piston 32 so that its head 31 is maintained in contact with the free end of the rocker arm 30, as shown in Fig. 2. The frame 35 of the vehicle is supported upon the axle 28 by springs 36.

Figure 4:
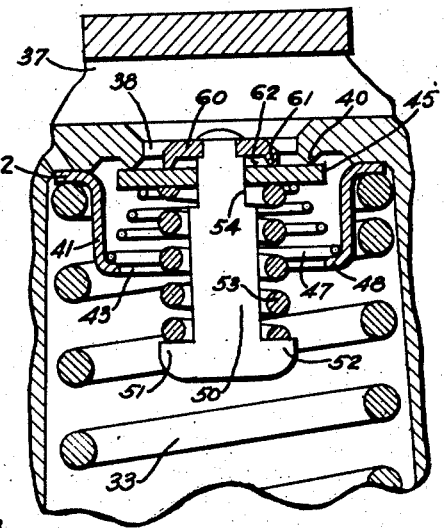
Fig. 4 is an enlarged sectional view of the fluid flow control device as shown in Fig. 2.

As shown in Figs. 2 and 4, piston 32 has a cross passage 37 in its head 31 which communicates with a port 38, said cross passage and port providing for the transfer of fluid from one side of the piston to the other in response to movements of the piston in one direction or the other. On the inside of the piston and around the port 38 there is provided an annular ridge 40 forming a valve seat. A cup-shaped cage 41 has an outwardly extending annular flange 42 which is maintained in engagement with the inside surface of the head of the piston 32 by spring 33. This cage has a central opening 43.

Figure 1:
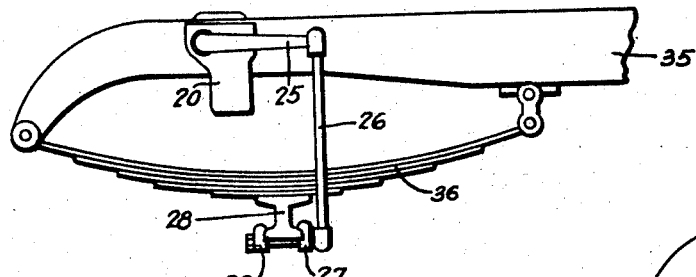
Fig. 1 is a fragmentary side view of a vehicle chassis, having a shock absorber embodying the present invention attached thereto.
Figure 3:
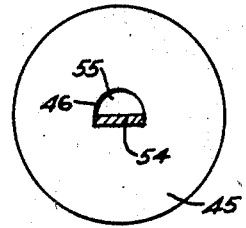
Fig. 3 is a detail sectional view of one of the elements of the fluid flow control device.

The fluid flow control device, which regulates the flow of fluid through the port 38, comprises a disc valve 45 punched from flat sheet metal, reference to Fig. 3 showing said disc valve as having a D-shaped central opening 46, that is, an opening one wall of which is substantially semi-circular in shape, the other being flat. This disc valve 45 is yieldably maintained against the valve seat 40 on the piston by a spring 47, one end of which engages the disc valve, the other being seated upon an inwardly extending flange 48 on the valve cage 41.

The fluid flow control device comprises also a stem 50 punched from flat sheet metal. At one end of this stem are two oppositely disposed ears 51 and 52 which form an abutment for the spring 53. A narrowed portion of the stem designated by the numeral 54 extends through the opening 46 in the disc valve 45. This narrowed portion of the stem 50 has a rectangular shaped cross section as shown in Fig. 3 and therefore provides the space designated by the numeral 55 in Figs. 2 and 3 which provides a passage for the fluid from one side of the disc valve to the other, as will be described.

The end of the stem 50, extending through the disc-valve 45, has the button valve 60 attached thereto, this button valve being saucer-shaped and convexedly engaging the disc-valve 45. More specifically button-valve 60 has an annular ridge 61 which is adapted to rest upon the disc-valve 45 and thus provides a space or chamber 62 between the disc-valve and button-valve, said chamber being in communication with the space 55 in the disc-valve 45, however, said chamber 62 being shut off from communication with the port 38 by the engagement of the annular flange or ridge 61 of the button-valve 60 with the disc-valve 45. Spring 53, as has been mentioned, has one end resting upon the ears 51 and 52 of the stem 50, the other end of this spring engaging the disc-valve 45, thus said spring yieldably urges the stem 50 so that the button-valve 60 attached thereto will have its annular ridge 61 yieldably maintained in engagement with the disc-valve 45.

The device functions as follows:

When the axle 28 is moved toward the frame 35 in response to the striking of an obstruction in the roadway by the vehicle wheels carried by the axle but not shown in the present drawing, arm 25 connected with the axle by link 26 will be moved counter-clockwise, resulting in a similar movement by the rocker arm 30, and thus spring 33 will cause piston 32 to follow this movement of the rocker arm so that the piston 32 will move out of the cylinder. Under these conditions fluid in the reservoir 21 will move through passage 37 and through port 38 against the valve 45, urging said valve from the seat 40 on the piston and thereby establishing a substantially free flow of fluid through the port 38 into the cylinder 22. It will be noticed that under these conditions the valve mechanism moves as a unit, that is, button-valve 60 moves with disc-valve 45 and thus actually forms a part of this valve when it functions as an intake valve.

When the spring 36, which has been compressed due to the movement of the axle 28 toward the frame 35, rebounds toward its normal load position, the linkage connection with the shock absorber operating arm 25 will move said arm clockwise, resulting in a similar movement of the rocker arm 30, thereby causing the piston 32 to be pushed downward into its cylinder and consequently valve 45 will close port 38 by seating upon the valve-seat 40. Now pressure is exerted upon the fluid within cylinder 22 and its only escape will be through the passage 55 presented between the stem 54 and the wall of the opening 46 of the disc-valve. No flow will be established through the opening 55 until a predetermined fluid pressure has been attained in the cylinder 22, this predetermined pressure overcoming the effect of spring 53 to hold valve 60 upon the disc-valve 45. As soon as the button-valve 60 is moved out of engagement with the disc-valve 45, the fluid under pressure will flow from the cylinder through the passage 55 into the chamber 62, where it will expand and flow through the orifice presented between the annular ridge 61 of the button-valve 60 and the adjacent surface of the disc-valve 45, this flow of fluid through this orifice being in the form of an annular sheet.

It has been discovered that a fluid flow at high velocity, if first injected into an expansion chamber as has been designated by the numeral 62, then allowing the flow from said chamber in the form of an annular sheet as through the orifice between 61 and 45, will substantially reduce any whistling or hissing noises which might result if said fluid flow at the same velocity would be ejected through a straight orifice. The flow of fluid on one side of the stem only, that is, through the passage 55, will tend to urge and maintain the stem to one side of said opening and therefore chattering of this valve is substantially eliminated, such chattering naturally resulting if a fluid flow is established on both sides of a valve as is usually the case in ordinary fluid flow control devices.

In the present invention applicant has provided a very effective fluid flow control device made up of four members punched from sheet metal, said members being the disc-valve 45, the button valve 60, the stem 50 and the cage 41 and also including two ordinary coil springs 47 and 53. It may well be understood that a valve made up from punched metal parts will be substantially cheaper than if made up from turned metal parts, the punched members being just as effective in their operation and as long lasting as any turned metal parts.

Applicant has also provided a valve which is substantially noiseless in its operation, the relative shapes of the opening in the disc-valve and the valve-stem extending therethrough being such that an unbalanced effect is obtained which practically eliminates chattering. Whistling and hissing noises are substantially eliminated by the provision of an expansion chamber into which the high velocity flow is first injected and from which the fluid may flow in an annular sheet-like spray under substantially lesser pressure.

The manufacture of this type of fluid flow control device is greatly reduced in cost inasmuch as greater variations or what may be termed greater irregularities in size and shape will be permissible in a device of this type than in a device made from turned metal parts.

While the form of embodiment as herein disclosed constitutes a preferred form, it is to be understood that other forms might be adopted, all coming within the scope of the claims which follow.

What is claimed is as follows:

1. A fluid flow control device for a port comprising, a disc-valve punched from flat, sheet metal and having an opening; a second disc-valve punched from flat sheet metal, adapted to engage the first disc-valve to close its opening; a stem punched from flat, sheet metal, attached to said second disc-valve, a portion of said stem extending through the opening in the first disc-valve so as to provide space between said stem portion and the wall of the opening; a spring urging the first disc-valve to close the port, and another spring engaging the stem to urge the second disc-valve upon the first disc-valve.

2. A fluid flow control device for a port comprising, a disc-valve having an irregularly shaped opening, said valve being punched from flat, sheet metal; a stem punched from flat, sheet metal, having a portion extending through said opening in the disc-valve, the cross-section of said portion being substantially rectangular in shape; a button valve punched from flat, sheet metal, attached to the stem, a spring urging the disc-valve to close the port; and a spring engaging the stem to urge the button valve upon the disc-valve to close the opening therein.

3. A fluid flow control device for a port comprising, a disc-valve punched from flat, sheet metal and having a D-shaped opening therein; a stem of flat, sheet metal, having oppositely disposed ears at one end and a narrowed portion adjacent the other end which extends through the opening in the disc-valve, said narrowed portion having a cross-section rectangular in shape; a button-valve punched from flat, sheet metal attached to the end of the stem opposite that having the oppositely disposed ears; a spring yieldably urging the disc-valve to close the port; and a spring about the stem, engaging the ears thereon to urge the stem yieldably to maintain the button-valve upon the disc-valve.

4. A fluid flow control device for a port having a valve-seat, comprising, a disc-valve punched from flat, sheet metal and having an opening; a punched sheet metal cage; a spring supported by the cage and engaging the disc-valve to urge it to close the port; a punched sheet metal stem having a portion extending through the opening in the disc-valve, said portion being of lesser dimensions than said opening so as to provide a space in the opening not filled by the stem; a punched sheet metal button secured to one end of the stem, said button having a circumferential ridge adapted to engage the side of the disc-valve resting upon the valve-seat of the port, the area on the disc-valve covered by the button being substantially greater than the opening in said disc-valve; and a spring interposed between the stem and disc-valve and yieldably urging the button upon said disc-valve.

5. A fluid flow control device for a port comprising, a disc-valve punched from sheet metal and having a perforation of predetermined size; a stem punched from sheet metal and having a portion extending through the perforation of said disc-valve of lesser rectangular cross-sectional area than the main part of the stem, said rectangular portion being smaller than said perforation so as to provide a space between said portion and the wall of the perforation; a saucer-shaped valve larger in transverse dimension than the perforation in the disc-valve attached to the stem, the outer peripheral edge of said saucer-shaped valve being bent over to form an angular flange for directly engaging the disc-valve and providing an expansion chamber directly between said two valves; a spring yieldably urging the disc-valve to close the port; and a spring engaging the stem and disc-valve, yieldably to urge the saucer-shaped valve upon the disc-valve.

6. A fluid flow control device for a port provided with a valve-seat, the combination with a disc-valve having a central perforation of predetermined size; resilient means yieldably urging said disc-valve into engagement with the valve-seat; a valve for controlling the fluid flow through the perforation in the disc-valve, said valve comprising a body portion formed from sheet metal so as to have oppositely disposed ears at one end, the other end being reduced to provide a rectangular portion of lesser cross sectional area than the other part of the body portion and also of lesser cross sectional area than the perforation in the disc-valve, said reduced end extending through the central perforation in the disc-valve, but not completely filling said perforation, a disc secured to said body portion and having a downturned peripheral flange adapted to engage the side of the disc-valve engaging the valve-seat at points substantially remote from the perforation in the disc-valve, and a spring interposed between the oppositely disposed ears of the body portion and the disc-valve.

7. A fluid flow control device adapted to regulate the flow of fluid in two directions through a port comprising, three separate members punched from flat, sheet metal, one of which is a disc-valve having an opening; another a saucer-shaped button-valve, the peripheral, downwardly turned edge of which engages the disc-valve to prevent fluid flow through its opening, the third being a stem having a portion extending through the opening in the disc-valve and providing space between it and the walls of said opening for the transfer of fluid through said disc-valve, said stem having the button valve attached thereto; a cage punched from flat, sheet metal; a spring between the cage and disc-valve, yieldably urging the latter to close the port; and a spring engaging the stem yieldably to urge the button-valve upon the disc-valve.

RALPH I. BATES.